US009870363B2

(12) United States Patent
Joseph et al.

(10) Patent No.: US 9,870,363 B2
(45) Date of Patent: *Jan. 16, 2018

(54) INTELLIGENTLY CATEGORIZING DATA TO DELETE SPECIFIED AMOUNTS OF DATA BASED ON SELECTED DATA CHARACTERISTICS

(71) Applicant: International Business Machines Corporation, Armonk, NY (US)

(72) Inventors: Dinakaran Joseph, Apex, NC (US); Devaprasad Khandurao Nadgir, Bangalore (IN); Ramkumar Ramalingam, Tamil Nadu (IN); David Elliot Shepard, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,530

(22) Filed: Apr. 19, 2016

(65) Prior Publication Data

US 2016/0232171 A1    Aug. 11, 2016

Related U.S. Application Data

(63) Continuation of application No. 14/081,181, filed on Nov. 15, 2013, now Pat. No. 9,355,118.

(51) Int. Cl.
*G06F 17/00* (2006.01)
*G06F 17/30* (2006.01)

(52) U.S. Cl.
CPC ...... *G06F 17/30117* (2013.01); *G06F 17/302* (2013.01); *G06F 17/3007* (2013.01);
(Continued)

(58) Field of Classification Search
CPC .......... G06F 17/3007; G06F 17/30117; G06F 17/30194; G06F 17/30085; G06F 17/30082; G06F 17/30707; G06F 17/302
(Continued)

(56) References Cited

U.S. PATENT DOCUMENTS 5,678,042 A   10/1997  Pisello
5,819,295 A   10/1998  Nakagawa
(Continued)

FOREIGN PATENT DOCUMENTS

WO    2012029258 A1    3/2012

OTHER PUBLICATIONS

Cachin, Christian, et al., "Policy-based Secure Deletion", CCS '13, Berlin, Germany, Nov. 4-8, 2013, pp. 259-270.
(Continued)

*Primary Examiner* — Robert Stevens
(74) *Attorney, Agent, or Firm* — Yudell Isidore PLLC

(57) ABSTRACT

A data processing system assigns stored documents within a distributed storage system (DSS) to various document categories to enable a target number of documents to be deleted. An intelligent storage management (ISM) utility identifies a data storage threshold value used to control data storage within the DSS. If a current storage usage exceeds the data storage threshold value, the ISM utility calculates, based on the current storage usage, a target number of documents that can be deleted from the DSS. The ISM utility utilizes a recursive process, which includes assigning stored documents to groups including a set of document categories based on data characteristics of the stored documents. The ISM utility further utilizes the recursive process to delete, based on an established ordering of the groups, all of the stored documents assigned to a subset of the groups in order to remove the target number of stored documents.

20 Claims, 7 Drawing Sheets

(52) U.S. Cl.
CPC .. *G06F 17/30082* (2013.01); *G06F 17/30085* (2013.01); *G06F 17/30194* (2013.01); *G06F 17/30707* (2013.01)

(58) Field of Classification Search
USPC ........................................................ 707/692
See application file for complete search history.

(56) References Cited

U.S. PATENT DOCUMENTS

| | | | |
|---|---|---|---|
| 6,185,576 | B1 | 2/2001 | McIntosh |
| 6,430,611 | B1 | 8/2002 | Kita |
| 6,985,944 | B2* | 1/2006 | Aggarwal ............. H04L 41/069 |
| | | | 707/999.003 |
| 7,343,459 | B2 | 3/2008 | Prahlad |
| 7,751,628 | B1 | 7/2010 | Reisman |
| 7,937,420 | B2 | 5/2011 | Tabellion |
| 7,957,991 | B2 | 6/2011 | Mikurak |
| 8,006,111 | B1 | 8/2011 | Faibish |
| 8,290,931 | B2 | 10/2012 | Hong |
| 8,407,164 | B2 | 3/2013 | Malik |
| 2002/0010708 | A1 | 1/2002 | McIntosh |
| 2005/0050578 | A1 | 3/2005 | Ryal |
| 2006/0095705 | A1* | 5/2006 | Wichelman ........... G06F 3/0605 |
| | | | 711/171 |
| 2011/0131174 | A1 | 6/2011 | Birch |
| 2011/0225361 | A1 | 9/2011 | Resch |
| 2012/0102009 | A1 | 4/2012 | Peterson |
| 2012/0317155 | A1 | 12/2012 | Ogasawara |
| 2013/0073602 | A1 | 3/2013 | Meadway |
| 2013/0166568 | A1 | 6/2013 | Binkert |
| 2013/0198226 | A1* | 8/2013 | Dhuse ............... G06F 17/30106 |
| | | | 707/769 |
| 2013/0212074 | A1 | 8/2013 | Romanski |
| 2015/0127607 | A1* | 5/2015 | Savage ............. G06F 17/30194 |
| | | | 707/610 |

OTHER PUBLICATIONS

Jatowt, Adam et al., "Detecting Age of Page Content", WIDM '07, Lisbon, Portugal, Nov. 9, 2007, pp. 137-144.
Diesburg, Sarah M., et al., "A Survey of Confidential Data Storage and Deletion Methods", ACM Computing Surveys, vol. 43, No. 1, Article 2, Nov. 2010, 37 pages.
Kaczmarski, Michael, et al., "Beyond backup toward storage management", IBM Systems Journal, vol. 42, No. 2, @2003, pp. 322-337.
Stevens, Robert, Non-Final Office Action, U.S. Appl. No. 15/132,628, The United States Patent and Trademark Office, dated May 31, 2017, 7 pages.
Xin et al., Shark: SQL and Rich Analytics at Scale, SIGMOD '13, Jun. 22-27, 2013, New York, NY, US, 12 pages.
Morales, Big Data and the Web: Algorithms for Data Intensive Scalable Computing, PhD Program in Computer Science and Engineering XXIV Cycle, IMT Institute for Advanced Studies, 2012, Lucca, Italy, pp. 1-170.
Chandrasekar, Ashok, et al., "Classification based Metadata Management for HDFS", HPCC 2012, Liverpool, UK, Jun. 25-27, 2012, 6 pages.

* cited by examiner

| 502 | 504 | 506 | 508 | 510 | 512 |
|---|---|---|---|---|---|
| 1st month | 2nd month | 3rd month | 4th month | 5th month | 6th month |
| 15230 | 16390 | 23499 | 20990 | 18000 | 25000 |

501

500

| 522 | 524 | 526 | 528 |
|---|---|---|---|
| 1st week | 2nd week | 3rd week | 4th week |
| 5000 | 5000 | 4770 | 1620 |

INTELLIGENTLY CATEGORIZING DATA TO DELETE SPECIFIED AMOUNTS OF DATA BASED ON SELECTED DATA CHARACTERISTICS

PRIORITY CLAIM

The present application is a continuation of and claims priority from U.S. patent application Ser. No. 14/081,181, entitled "System and Method for Intelligently Categorizing Data to Delete Specified Amounts of Data Based on Selected Data Characteristics," filed on Nov. 15, 2013, and which is fully incorporated herein by reference.

BACKGROUND

1. Technical Field

The present disclosure generally relates to data storage management and in particular to data storage management within distributed storage systems.

2. Description of the Related Art

Large scale storage systems (also referred to as "Big Data") are currently facing a number of critical challenges. These challenges include (a) an unchecked growth in data volumes leading to storage cost overruns, (b) the immaturity and complexity of Big Data platforms, and (c) the need to quickly and efficiently obtain insights from all of the stored data. Storage costs are increasing for companies engaging in Big Data Analytics initiatives. Even though the cost of storage hardware has been declining each year, these cost declines do not keep pace with the rate of data growth. There are several approaches currently being used to tackle this storage space problem. For example, some companies choose to store all of their data on low-cost tape. Other companies choose an advanced data compression technique to make sure more data can be stored within less space. Still, other companies choose to remove or "prune" the old data and keep only the newer and more relevant data in order to manage space. However, these companies must address challenges associated with the storage of documents across distributed storage systems and/or search clusters in which documents are stored on different search nodes and/or processing and storage systems.

BRIEF SUMMARY

Disclosed are a data processing system (DPS) and a computer program product that assigns stored documents within a distributed storage system (DSS) to various document categories to enable a target number of documents to be deleted. An intelligent storage management (ISM) utility identifies a data storage threshold value used to control data storage within the DSS. If a current storage usage exceeds the data storage threshold value, the ISM utility calculates, based on the current storage usage, a target number of documents that can be deleted from the DSS. The ISM utility utilizes a recursive process which includes assigning stored documents to groups including a set of document categories based on data characteristics of the stored documents. The ISM utility further utilizes the recursive process to delete, based on an established ordering of the groups, all of the stored documents assigned to a subset of the groups in order to remove the target number of stored documents.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates a table showing a number of stored documents divided among time-based categories spanning a six month time period in which stored documents are posted or acquired within a DSS, in accordance with one or more embodiments;

DETAILED DESCRIPTION

Figure 1:
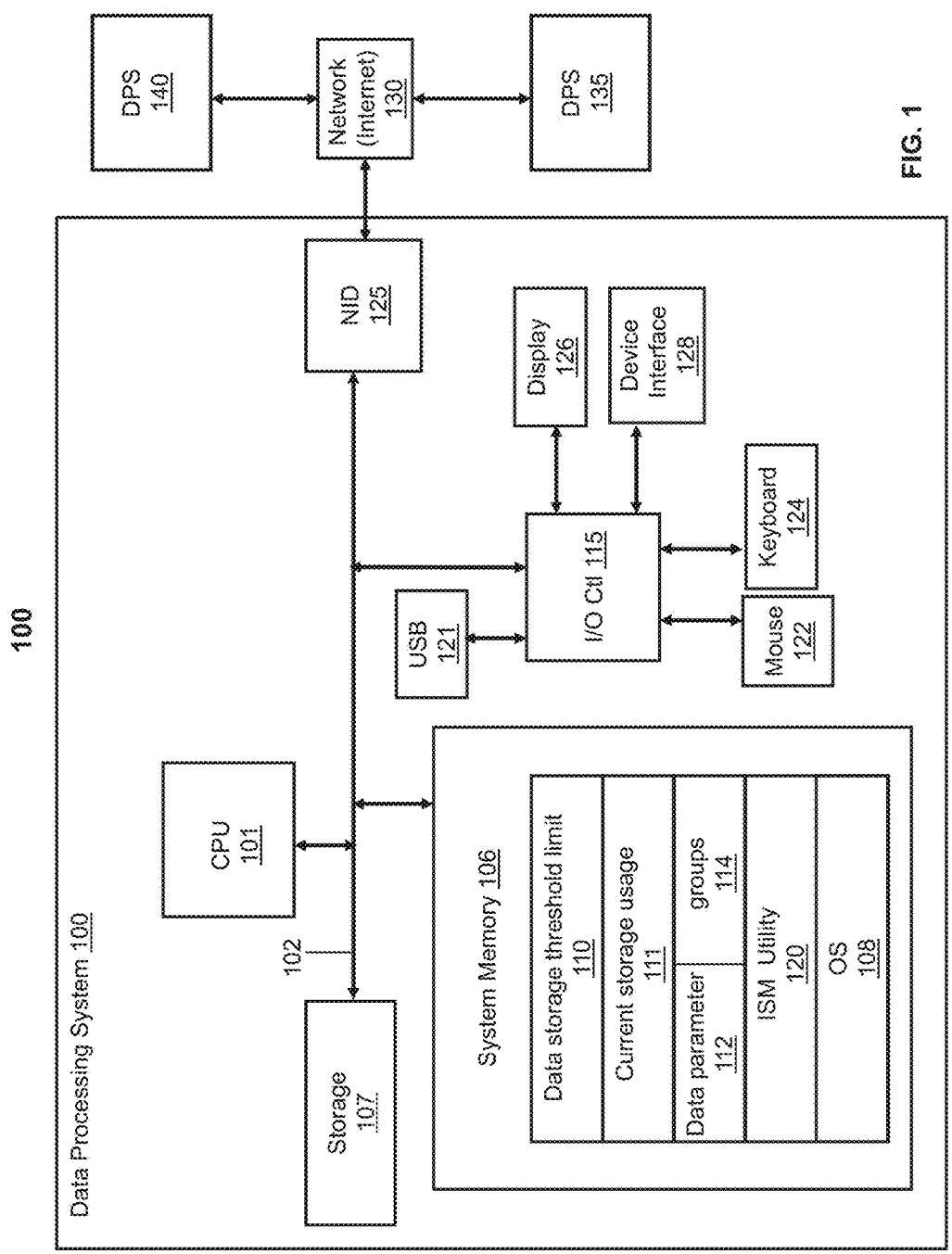
FIG. 1 illustrates an example data processing system (DPS) within which various aspects of the disclosure can be implemented, according to one or more embodiments.

The illustrative embodiments provide a data processing system (DPS) and a computer program product that assigns stored documents within a distributed storage system (DSS) to various document categories to enable a target number of documents to be deleted. An intelligent storage management (ISM) utility identifies a data storage threshold value used to control data storage within the DSS. If a current storage usage exceeds the data storage threshold value, the ISM utility calculates, based on the current storage usage, a target number of documents that can be deleted from the DSS. The ISM utility utilizes a recursive process which includes assigning stored documents to groups including a set of document categories based on data characteristics of the stored documents. The ISM utility further utilizes the recursive process to delete, based on an established ordering of the groups, all of the stored documents assigned to a subset of the groups in order to remove the target number of stored documents.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example data processing system (DPS) 100, within which one or more of the described features of the various embodiments of the disclosure can be implemented. DPS 100 includes one or more processor(s) 101 coupled to system memory 106 via system interconnect 102. System interconnect 102 can be interchangeably referred to as a system bus, in one or more embodiments. As shown, system memory 106 can include therein a plurality of executable modules, including operating system (O/S) 108 and intelligent storage management (ISM) utility 120. In addition, system memory 106 includes information associated with a distributed storage system (DSS) such as a pre-established data storage threshold limit 110 and current storage usage 111. In addition, system memory 106 comprises data parameter 112 that can be used to categorize documents stored within the DSS into one or more groups 114. The various software and/or firmware modules have varying functionality when their corresponding program code is executed by processor(s) 101 or other processing devices within DPS 100.

DPS 100 further includes one or more input/output (I/O) controllers 115 which support connection to and processing of signals from one or more connected input device(s), such as a keyboard 124 or mouse 122. I/O controllers 115 also support connection to and forwarding of output signals to one or more connected output device(s), such as a monitor or display device 126. In addition, DPS 100 includes universal serial bus (USB) 121 which is coupled to I/O controller 115. Additionally, in one or more embodiments, one or more device interface(s) 128, such as an optical reader, a card reader, and/or a high-definition multimedia interface (HDMI), can be associated with DPS 100. Device interface(s) 128 can be utilized to enable data to be read from or stored to corresponding removable storage device(s), such as a compact disk (CD), digital video disk (DVD), flash drive, or flash memory card. In one or more embodiments, device interface(s) 128 can also provide an integration point for connecting other device(s) to DPS 100.

DPS 100 comprises a network interface device (NID) 125. NID 125 enables DPS 100 to communicate and/or interface with other devices, services, and components that are located external to DPS 100. These devices, services, and components can interface with DPS 100 via an external network, such as example network 130, using one or more communication protocols. In particular, in one implementation, DPS 100 uses NID 125 to connect to second DPS (server) 135 and third DPS (server) 140 via an external network, such as network 130.

Network 130 can be a local area network, wide area network, personal area network, and the like, and the connection to and/or between network 130 and DPS 100 can be wired or wireless or a combination thereof. For purposes of discussion, network 130 is indicated as a single collective component for simplicity. However, it is appreciated that network 130 can comprise one or more direct connections to other devices as well as a more complex set of interconnections as can exist within a wide area network, such as the Internet.

Figure 2:
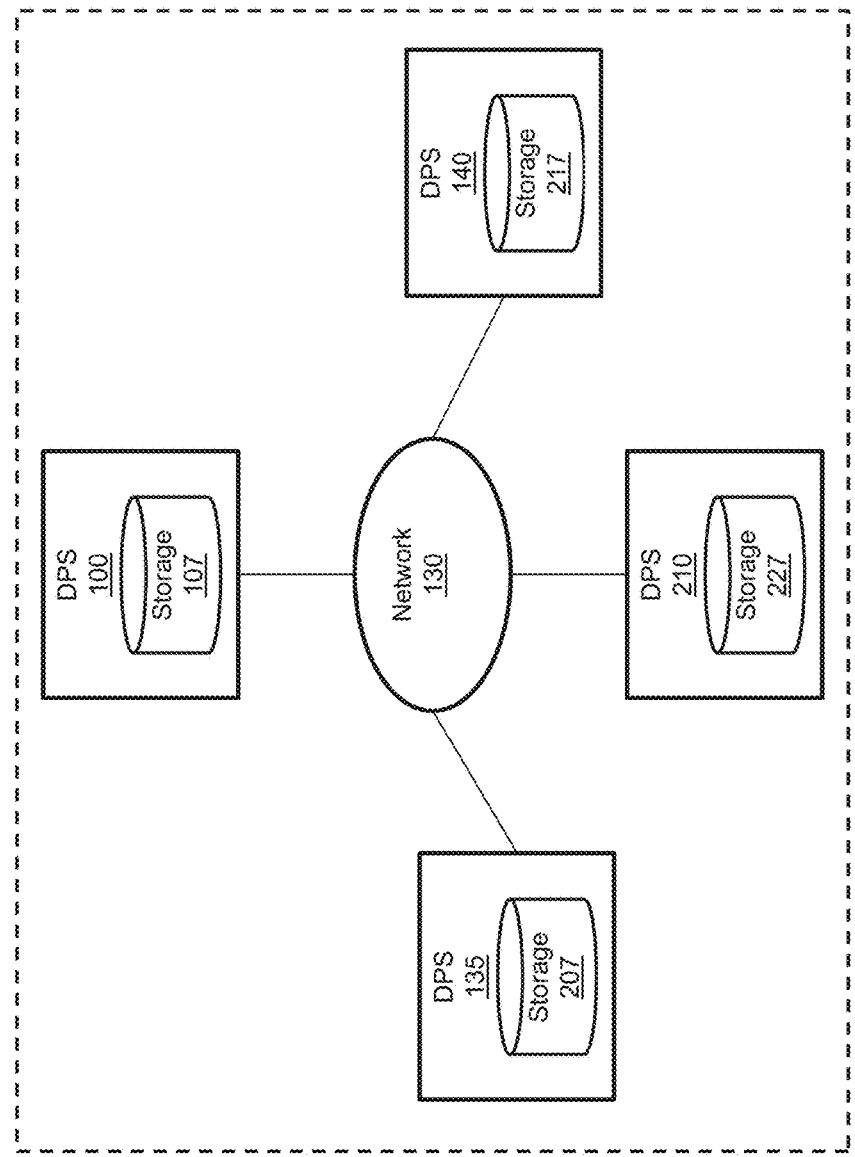
FIG. 2 illustrates a block diagram of an example distributed storage system (DSS) which includes multiple interconnected data processing systems, in accordance with one or more embodiments.

With specific reference now to FIG. 2, there is depicted a block diagram of an example distributed storage system (DSS) which includes multiple interconnected data processing systems (DPS), in accordance with one or more embodiments. DSS 200 comprises first DPS 100 which operates as a primary node or controlling DPS within DSS 200. As illustrated in FIG. 1, DPS 100 comprises ISM utility 120. DSS 200 also comprises second DPS 135, third DPS 140 and fourth DPS 210. In addition, DSS 200 comprises network 130 which enables communication between the multiple DPS within DSS 200. Each of the multiple DPS within DSS 200 comprises a corresponding storage. As illustrated, first DPS 100 comprises storage 107. Second DPS 135 comprises storage 207. Third DPS 140 comprises storage 217. Fourth DPS 210 comprises storage 227.

Intelligent storage management (ISM) utility 120 assigns stored documents to various document categories to enable a target number of documents to be deleted. ISM utility 120 identifies a data storage threshold value used to control data storage within a distributed storage system (DSS). If a current storage usage exceeds the data storage threshold value, ISM utility 120 calculates, based on the current storage usage, a target number of documents that can be deleted from the DSS. ISM utility 120 utilizes a recursive process which includes assigning stored documents to groups including a set of document categories based on data characteristics of the stored documents. ISM utility 120 further utilizes the recursive process to delete, based on an established ordering of the groups, all of the stored documents assigned to a subset of the groups in order to remove the target number of stored documents.

ISM utility 120 determines a data characteristic parameter that can be used to identify parameter values of the stored documents and assigns the stored documents into the plurality of groups, based on corresponding data parameter values. In one embodiment, the data characteristic parameter is one of (a) an age of stored documents and (b) an acquisition period of stored documents. In addition, the plurality of groups associated with the data characteristic parameter can be time-based interval groups including at least one of: (a) a collection of months that span an identified document acquisition period; (b) a collection of weeks that span an identified document acquisition period; (c) a collection of hours that span an identified document acquisition period; and (d) any other collection of time intervals of a measurable time span associated with an identified document acquisition period.

ISM utility 120 identifies a data storage threshold value by identifying a respective value for a pre-determined data storage limit for each node from among a number of nodes within DSS 200. ISM utility 120 then calculates a sum of the respective values for pre-determined data storage limit for the nodes in DSS 200 in order to determine the data storage limit for DSS 200.

ISM utility 120 deletes stored documents by first identifying each stored document at each node in a document category in which stored documents are marked for deletion. ISM utility 120 respectively removes, at each DPS (or node) within DSS 200, each document assigned to the document category for which stored documents are marked for deletion.

Those of ordinary skill in the art will appreciate that the hardware, firmware/software utility, and software components and basic configuration thereof depicted in FIGS. 1 and 2 may vary. The illustrative components of DPS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 3:
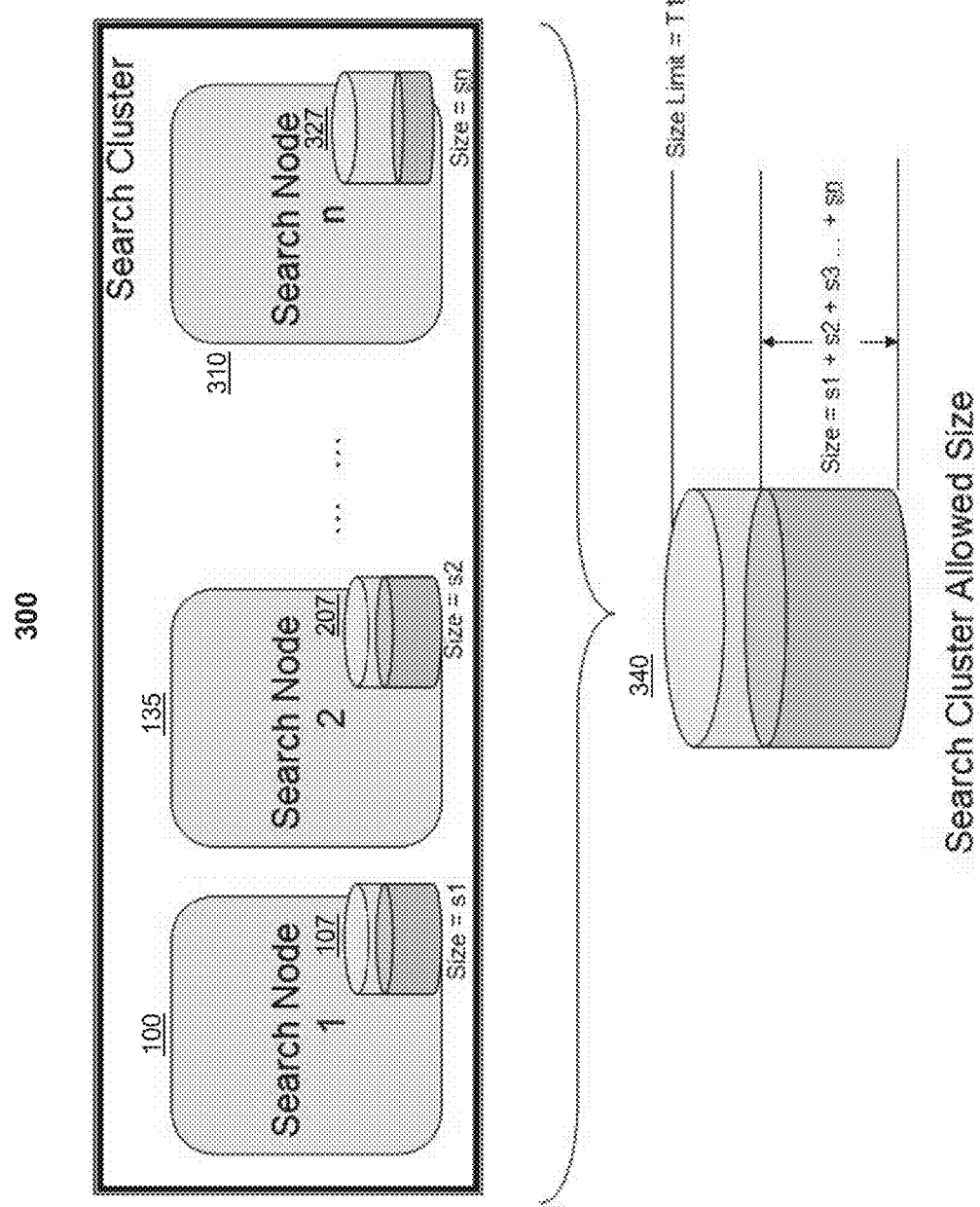
FIG. 3 illustrates a block diagram of an example search cluster of associated search nodes, in accordance with one or more embodiments.

FIG. 3 illustrates a block diagram of an example search cluster of associated search nodes, in accordance with one or more embodiments. Search Cluster 300 comprises multiple DPS including first DPS 100 which is illustrated as "Search Node 1". First DPS 100 operates as a primary search node or controlling DPS within Search Cluster 300. Search Cluster 300 also comprises second DPS 135 illustrated as "Search Node 2" and n-th DPS 310 illustrated as "Search Node n". In addition, Search Cluster 300 comprises network 130 which enables communication between the multiple DPS within Search Cluster 300. Each of the multiple DPS within Search Cluster 300 comprises a corresponding storage. As illustrated, first DPS 100 comprises first storage 107. Second DPS 135 comprises second storage 207. N-th DPS 310 comprises n-th storage 327. As illustrated, first storage 107 has a current storage usage amount or "size" that is equal to "s1". Second storage 207 has a current storage usage amount or "size" that is equal to "s2". N-th storage 327 has a current storage usage amount or "size" that is equal to "sN". Also illustrated in search cluster 300 is virtual aggregate storage 340 which is a single symbolic representation for an aggregation of the storages of the multiple DPS within search cluster 300. Virtual aggregate storage 340 has corresponding storage size limit 342. In the example of FIG. 3, storage size limit 342 is equal to "T1".

In one embodiment, ISM utility 120 identifies a data storage threshold value, which is substantially identical to a storage size limit, by accessing stored information about the data storage threshold value from memory. In another embodiment, ISM utility 120 determines the data storage threshold value by identifying a respective value for a pre-determined data storage limit for each of the "n" nodes within search cluster 300. ISM utility 120 then calculates a sum of the respective values for pre-determined data storage limit for the nodes in the search cluster in order to determine the aggregate data storage threshold limit for search cluster 300. As illustrated in search cluster 300, ISM utility 120 determines an aggregate current storage usage amount or size by calculating a sum of the respective values for current storage usage size for the nodes in search cluster 300. In particular, the aggregate current storage usage amount or size is equal to $s1+s2+s3+ \ldots sn$, where s3 is the current storage usage amount for a third DPS (not explicitly shown).

Figure 4:
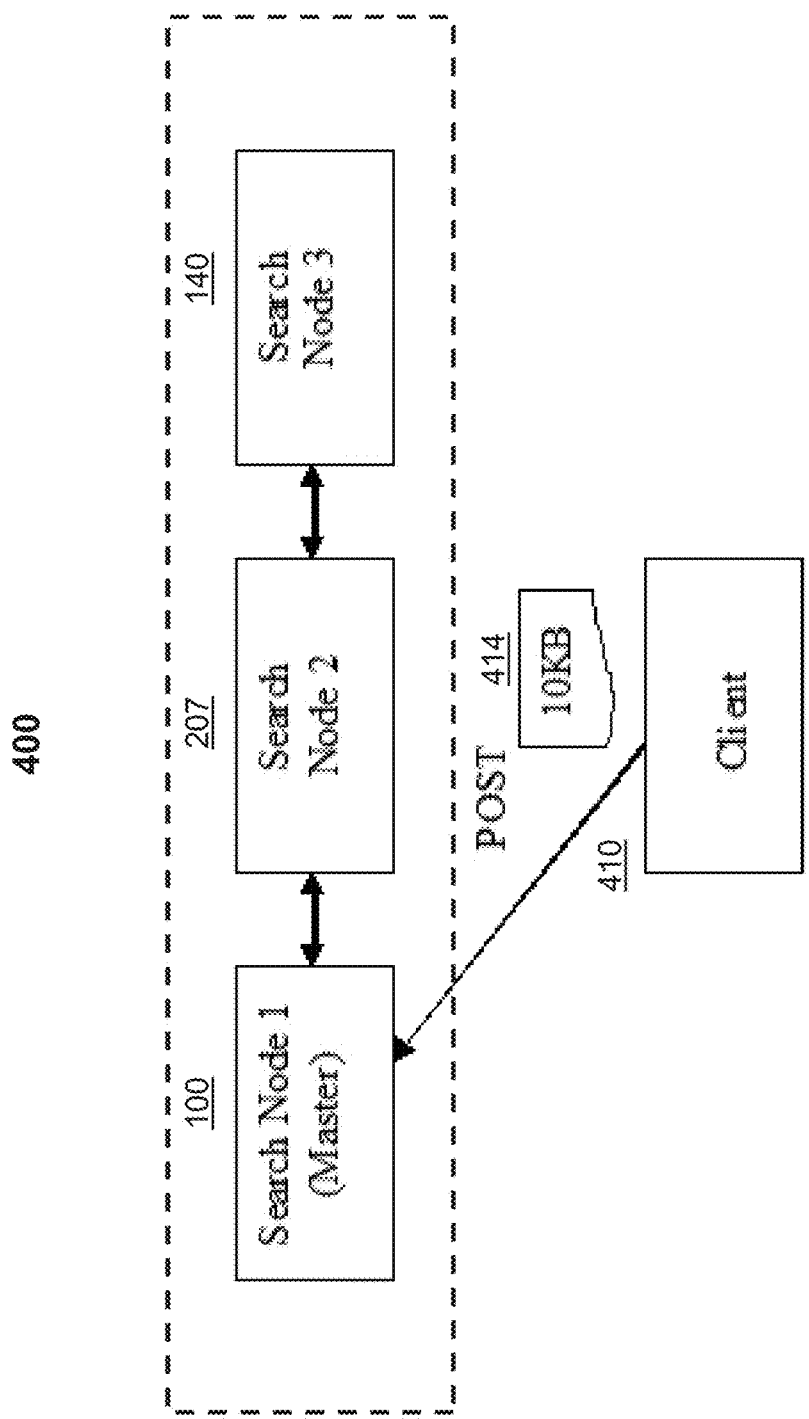
FIG. 4 illustrates a block diagram of an example search cluster that a client accesses to post documents that are indexed within the search cluster, in accordance with one or more embodiments.

FIG. 4 illustrates a block diagram of an example search cluster that a client accesses to post documents that are indexed within the search cluster, in accordance with one or more embodiments. Search Cluster 400 comprises first DPS 100 which operates as a primary search node or controlling DPS within Search Cluster 400. Search Cluster 400 also comprises second DPS 135 and third DPS 140. Each of the search nodes within Search cluster 400 are communicatively coupled to each other. Each of the multiple DPS within Search Cluster 400 comprises a corresponding storage (not shown).

Client 410 accesses first or controlling search node 100 of search cluster 400 to post first document 414. As illustrated, at a time of document posting, first document 414 has a raw document size of 10 KB. ISM utility 120 receives first document 414 and assigns an index to first document 414. After first document 414 is indexed within search cluster or engine 400, the size of first document 414 is expanded to include document parameter data such as a data type and a data acquisition timestamp. For example, the size of first document 414 is increased to a document size within a range of 15 KB to 20 KB. In one embodiment, the increase in document size depends on the various data type settings in the search engine provided by DSS 200.

FIG. 5 illustrates a table showing a number of stored documents divided among time-based categories spanning a six month time period in which stored documents are posted or acquired within a DSS, in accordance with one or more embodiments. Tables 500 comprise first table 501 and second table 520. Table 501 comprises six columns and two rows. A first row of each column identifies a corresponding document category and a second row of each column identifies a corresponding count of stored documents within each associated document category. As illustrated, within first column 502, the first row indicates that the first document category is a first month of data acquisition within a six month span and is identified as "$1^{st}$ month." The second row indicates that 15230 stored documents are assigned to the first month. More specifically, 15230 stored documents were acquired within the DSS within the first month.

Second column 504 indicates, within the first row, that the second document category is a second month of data acquisition within a six month span and is identified as "$2^{nd}$ month." The second row indicates that 16390 stored documents are assigned to the second month. More specifically, 16390 stored documents were acquired within the DSS within the second month.

Third column 506 indicates, within the first row, that the third document category is a third month of data acquisition within a six month span and is identified as "3$^{rd}$ month." The second row indicates that 23499 stored documents are assigned to the third month. More specifically, 23499 stored documents were acquired within the DSS within the third month.

Fourth column 508 indicates, within the first row, that the fourth document category is a fourth month of data acquisition within a six month span and is identified as "4$^{th}$ month." The second row indicates that 20990 stored documents are assigned to the fourth month. More specifically, 20990 stored documents were acquired within the DSS within the fourth month.

Fifth column 510 indicates, within the first row, that the fifth document category is a fifth month of data acquisition within a six month span and is identified as "5$^{th}$ month." The second row indicates that 18000 stored documents are assigned to the fifth month. More specifically, 18000 stored documents were acquired within the DSS within the fifth month.

Sixth column 512 indicates, within the first row, that the sixth document category is a sixth month of data acquisition within a six month span and is identified as "6$^{th}$ month." The second row indicates that 25000 stored documents are assigned to the sixth month. More specifically, 25000 stored documents were acquired within the DSS within the sixth month.

Second table 520 is a result of a next-level categorization of the "2$^{nd}$ month" category of first table 501. Second table 520 comprises four columns and two rows. A first row of each column identifies a corresponding document sub-category or next-level category and a second row of each column identifies a corresponding count of stored documents within each associated document sub-category. As illustrated, within first column 522, the first row indicates that the first document sub-category is a first week of data acquisition within a four week span (of the second month) and is identified as "1$^{st}$ week." The second row indicates that 5000 stored documents are assigned to the first week. More specifically, 5000 stored documents were acquired within the DSS within the first week of the second month.

Second column 524 indicates, within the first row, that the second document category is a second week of data acquisition within the four week span and is identified as "2$^{nd}$ week." The second row indicates that 5000 stored documents are assigned to the second week. More specifically, 5000 stored documents were acquired within the DSS within the second week.

Third column 526 indicates, within the first row, that the third document category is a third week of data acquisition within a four week span and is identified as "3$^{rd}$ week." The second row indicates that 4770 stored documents are assigned to the third week. More specifically, 4770 stored documents were acquired within the DSS within the third week.

Fourth column 528 indicates, within the first row, that the fourth document category is a fourth week of data acquisition within the four week span and is identified as "4$^{th}$ week." In one embodiment, a range of 7 to 10 days can be used to represent the fourth week to accommodate a month (e.g., February in a non-leap year) having 28 days and months having 31 days. The second row indicates that 1620 stored documents are assigned to the fourth week. More specifically, 1620 stored documents were acquired within the DSS within the fourth week.

ISM utility 120 selects a set of document (first level) categories that are associated with an identified time-based data characteristic parameter. In particular, the time-based data characteristic parameter is a selected time-period of document acquisition. For example, in table 501, the time-based data characteristic parameter is a month of document acquisition within a span of six months. The selected set of document categories provide an initial set of groups to which stored documents can be assigned. ISM utility 120 assigns stored documents to the selected set of document categories based on corresponding parameter values associated with the determined data characteristic parameter. In table 501, the selected set of document categories are a corresponding collection of six months of data acquisition. Each parameter value associated with the month of data acquisition parameter is one of: (i) a first month; (ii) a second month; (iii) a third month; (iv) a fourth month; (v) a fifth month; and (vi) a sixth month.

In one embodiment, ISM utility 120 selects a set of document (first level) categories that are associated with multiple different data characteristic parameters. For example, ISM utility 120 selects a set of document (first level) categories that indicate relative priority and/or relevance based on both (a) an identified time-based data characteristic parameter and (b) document access statistics.

In the example of tables 500, ISM utility 120 identifies the target number of documents that can be deleted as 30000 documents (i.e., the most aged 30000 documents according to acquisition period). ISM utility 120 enables documents to be deleted by document categories but does not enable deletion by document count. As a result, ISM utility 120 determines a maximum number of document categories, from among the selected set of document categories, for which all corresponding stored documents can be removed without exceeding the target number of documents that can be deleted. Since the first category, which corresponds to the first month of data acquisition, contains 15230 stored documents which is less than 30000 documents (i.e., the target number of documents for deletion), ISM utility 120 deletes or marks for deletion all documents within the first month of data acquisition category. The second category which corresponds to the second month of data acquisition comprises 16390 stored documents. Since 15230 added to 16390 equals 31620 which exceeds 30000, ISM utility 120 cannot delete the stored documents within the second category. Thus, ISM utility 120 determines that the maximum number of first-level document categories from which all stored documents can be deleted is "1" (i.e., the first month). However, ISM utility 120 further categorizes documents within the second month in order to perform further deletions.

More generally, in response to the maximum number of first-level document categories being greater than zero, ISM utility 120 deletes all of the stored documents (marked for deletion) corresponding to the maximum number of document categories from among the selected set of document categories. ISM utility 120 determines whether a count of all the removed stored documents is less than the target number of documents that can be deleted. In response to the count being less than the target number of stored documents that can be deleted, ISM utility 120 identifies a next document category of remaining, stored documents. The identified next document category is adjacent to a document category most recently identified for providing stored documents to be deleted. The identified category is a target document category which comprises corresponding stored documents that can be further categorized. However, in response to the maximum number being equal to zero, ISM utility 120 selects, from among the identified set of document categories, a first category as a target document category having corresponding stored documents that can be further categorized. The first category holds a first position relative to other document categories based on a corresponding range of parameter values.

ISM utility 120 executes a process to further categorize stored documents from the target document category into sub-categories and delete documents from an associated one or more sub-category to arrive at the target number. In particular, ISM utility 120 divides the target document category into multiple associated sub-categories respectively associated with different ranges of corresponding data characteristic parameter values. The multiple associated sub-categories are next-level categories derived from a corresponding target document category. ISM utility 120 assigns stored documents from the target document category into the multiple sub-categories, according to respective data characteristic parameter values. ISM utility 120 determines a maximum number of document sub-categories for which all corresponding stored documents can be deleted without causing a total overall deletion to exceed the target number of stored documents that can be deleted. ISM utility 120 then deletes all of the documents corresponding to the determined maximum number of document sub-categories. ISM utility 120 determines whether the total overall count of all the deleted documents is less than the target number of stored documents that can be deleted.

In response to the total overall count being less than the target number of stored documents that can be deleted, ISM utility 120 recursively performs a set of functions to further categorize and then delete up to the target number of documents for deletion. In particular, ISM utility 120 identifies a document sub-category having corresponding stored documents that can be further categorized and divides the identified document sub-category into a plurality of next-level sub-categories. ISM utility 120 assigns stored documents from the identified document sub-category into the plurality of next-level sub-categories, according to respective data characteristic parameter values. ISM utility 120 determines a maximum number of next-level sub-categories for which all corresponding stored documents can be deleted without causing a total overall deletion to exceed the target number of stored documents that can be deleted. ISM utility 120 deletes (or identifies for subsequent deletion) all of the stored documents corresponding to the determined maximum number of next-level sub-categories. ISM utility 120 determines whether the total overall count of deleted documents or documents marked for deletion is less than the target number.

Referring again to tables 500, ISM utility 120 divides the second month category of column 504 to provide the following four categories: (i) $1^{st}$ week; (ii) $2^{nd}$ week; (iii) $3^{rd}$ week; and (iv) $4^{th}$ week. ISM utility 120 is able to delete stored documents (5000+5000+4770=14770) corresponding to the first three weeks (i.e., the first week, the second week and the third week) since this current deletion of stored documents brings the total overall count to 30000. As a result, ISM utility 120 avoids exceeding 30000 deleted documents by not deleting stored documents corresponding to the fourth week. In particular, ISM utility 120 deletes 15000 documents from a first-level categorization and 14770 documents from a second or next level categorization to delete no more than the target number of 30000 (of the oldest or least relevant) documents.

However, if ISM utility 120 is unable to delete the target number of documents (e.g., 30000) with the second level of categorization, ISM utility 120 performs a third level of categorization to divide the fourth week category into categories corresponding to each day interval from among seven days of the week. The corresponding documents from the fourth week is appropriately distributed or assigned to the respective day categories. Thus, ISM utility 120 recursively executes a number of functions including performing a next-level categorization and appropriately deleting stored documents to remove up to the target number of documents that can be deleted.

Figure 6:
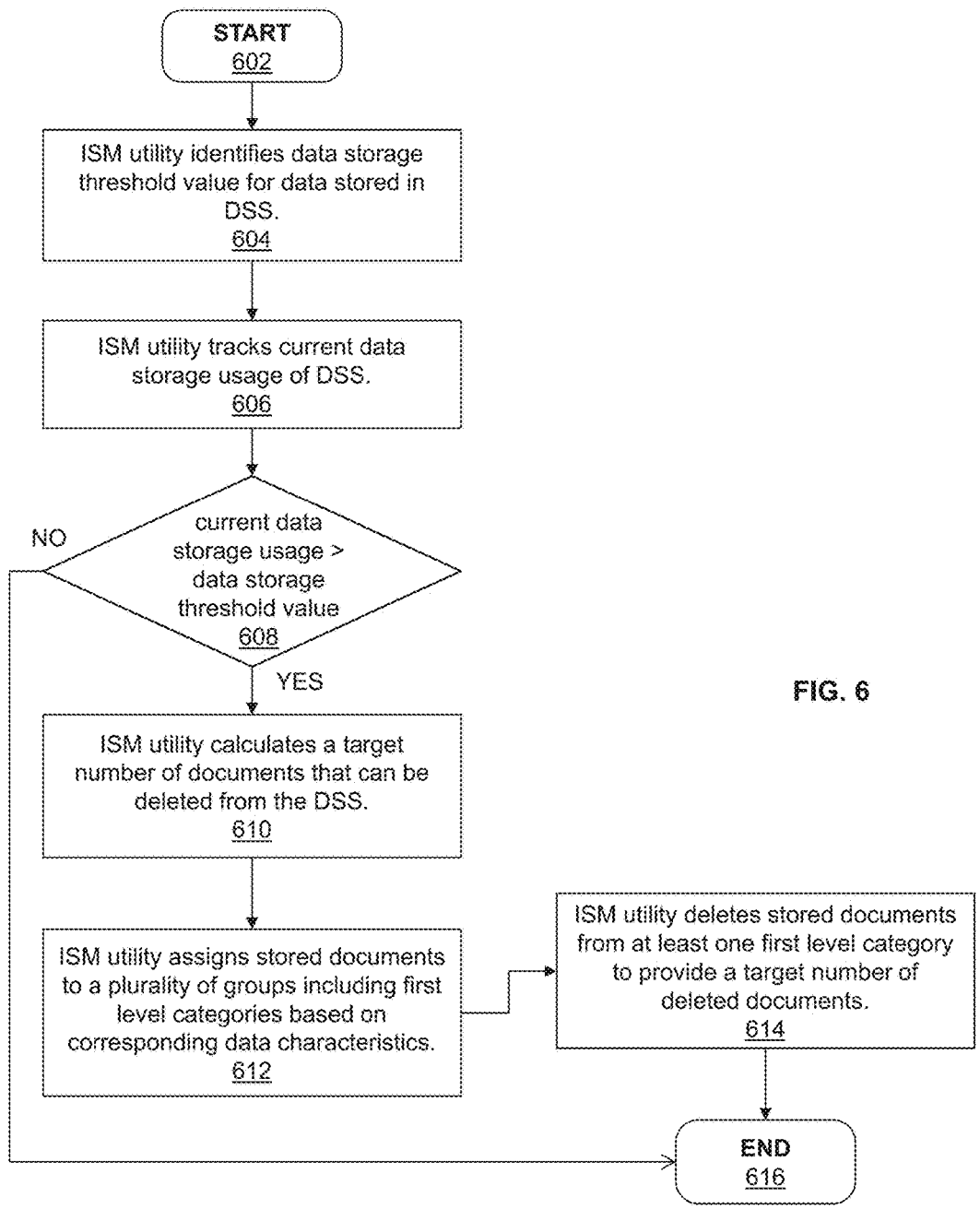
FIG. 6 is a flow chart illustrating a method for assigning stored documents to document categories that enable a target number of documents to be deleted.
Figure 7:
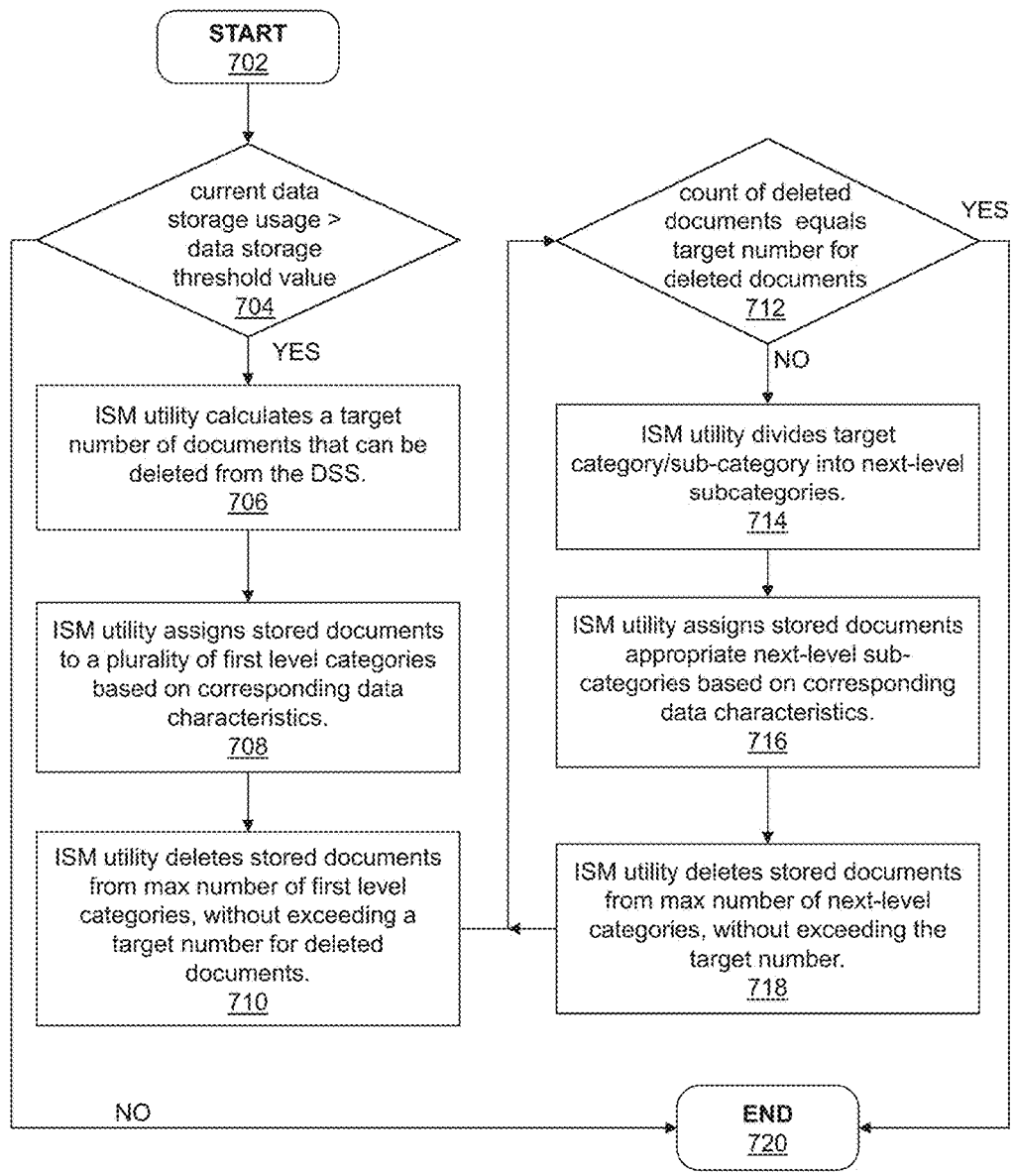
FIG. 7 is a flow chart illustrating a method for recursively assigning stored documents to document categories and sub-categories to enable a target number of documents to be deleted, in accordance with one or more embodiments.

FIG. 6 and FIG. 7 present flowcharts illustrating example methods by which DPS 100 presented within the preceding figures performs different aspects of the processes that enable one or more embodiments of the disclosure. Generally, method 600 and method 700 collectively represent methods for assigning stored documents to various document categories to enable a target number of documents to be deleted. The description of each method is provided with general reference to the specific components illustrated within the preceding figures. Generally each method is described as being implemented via execution of ISM utility 120 within DPS 100. It is, however, appreciated that certain aspects of the described methods may be implemented via other processing devices and/or execution of other code. In the discussion of FIG. 6 and FIG. 7, reference is also made to elements described in FIG. 1-FIG. 5.

FIG. 6 illustrates an example method for assigning stored documents to document categories that enable a target number of documents to be deleted. Method 600 begins at the start block 602 and proceeds to block 604 where ISM utility 120 identifies a data storage threshold value for data stored in DSS 200. At block 606, ISM utility 120 tracks a current data storage usage of DSS 200. At decision block 608, ISM utility 120 determines whether a current data storage usage exceeds the identified or pre-established data storage threshold value. If ISM utility 120 determines that the current data storage usage exceeds the identified data storage threshold value, ISM utility 120 calculates a target number of documents that can be deleted from the network cluster, as shown at block 610. At block 612, ISM utility 120 assigns stored documents to a plurality of groups including first level categories based on corresponding data characteristics. At block 614, ISM utility 120 deletes stored documents corresponding to at least one first level category to provide a target number of deleted documents. However, if at decision block 608, ISM utility 120 determines that the current data storage usage does not exceed the pre-established data storage threshold value, the process moves to end block 616.

FIG. 7 illustrates an example method for recursively assigning stored documents to document categories and sub-categories to enable a target number of documents to be deleted. Method 700 begins at start block 702 and proceeds to decision block 704 where ISM utility 120 determines whether a current data storage usage exceeds the identified or pre-established data storage threshold value. If ISM utility 120 determines that the current data storage usage exceeds the identified data storage threshold value, ISM utility 120 calculates a target number of documents that can be deleted from the DSS, as shown at block 706. At block 708, ISM utility 120 assigns stored documents to a number of first level categories based on corresponding data characteristics. At block 710, ISM utility 120 deletes stored documents from a maximum number of first level categories, without exceeding a target number for deleted documents. At decision block 712, ISM utility 120 determines whether a count of deleted documents equals a target number for deleted documents. If at decision block 712, ISM utility 120 determines that the count of deleted documents equals the target number for deleted documents, the process moves to end block 720. However, if ISM utility 120 determines that the count of deleted documents is less than the target number for deleted documents, ISM utility 120 divides a target/adjacent category/sub-category which is next to a category corresponding to previously deleted documents into next-level subcategories, as shown at block 714.

At block 716, ISM utility 120 assigns stored documents from the target category to appropriate next-level sub-categories based on corresponding data characteristics. ISM utility 120 deletes stored documents from a maximum number of next-level categories, without exceeding the target number, as shown at block 718. Following block 718, the process returns to block 712.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A data processing system (DPS) operating within a distributed storage system (DSS), the DPS comprising:
   at least one processor;
   a memory system having stored therein a utility, which when executed by the processor causes the processor to:

identify a pre-established data storage threshold value for an amount of data that can be stored within the DSS;

track a current storage usage for an amount of data stored within the DSS;

determine whether the current storage usage exceeds the pre-established data storage threshold value;

in response to determining that the current storage usage exceeds the pre-established data storage threshold value, calculate a target number of documents that can be deleted from the DSS based on an amount by which the current storage usage exceeds the pre-established data storage threshold value, wherein the current storage usage is proportional to a number of stored documents in the DSS, wherein the stored documents have a same document type;

assign stored documents to a plurality of groups including a set of document categories based on corresponding data characteristics, wherein the groups are ordered based on a relative index associated with corresponding values for data characteristics, wherein all of the stored documents assigned to at least one of the plurality of groups can be deleted, based on an order associated with the relative index of the document categories, in order to provide the target number of documents that can be deleted; and delete all of the stored documents assigned to at least one of the plurality of groups in order to remove the target number of stored documents.

2. The DPS of claim 1, wherein the utility further caused the processor to determine a data characteristic parameter that can be used to identify parameter values of the stored documents, which parameter values enable the stored documents to be assigned into the plurality of groups, the data characteristic parameter being one parameter from among (a) an age of stored documents and (b) an acquisition period of stored documents.

3. The DPS of claim 1, wherein the plurality of groups associated with the data characteristic parameter are time-based groups selected from among groups comprising: (a) a collection of months that span an identified document acquisition period; (b) a collection of weeks that span an identified document acquisition period; (c) a collection of hours that span an identified document acquisition period; and (d) any other collection of time intervals of a measurable time span associated with an identified document acquisition period.

4. The DPS of claim 1, wherein to assign the stored documents to groups, the processor:

selects a set of document categories that are associated with a determined data characteristic parameter, wherein the selected set of document categories provide an initial set of groups to which stored documents are assigned;

assigns stored documents to the selected set of document categories based on corresponding parameter values associated with the determined data characteristic parameter;

determines a maximum number of document categories, from among the selected set of document categories, for which all corresponding stored documents can be removed without exceeding the target number of documents that can be deleted; and in response to the maximum number being greater than zero, deletes all of the stored documents corresponding to the maximum number of document categories from among the selected set of document categories.

5. The DPS of claim 4, wherein the processor:

in response to the maximum number being equal to zero, selects, from among the identified set of document categories, a first category as a target document category having corresponding stored documents that can be further categorized, wherein the first category holds a first position relative to other document categories based on a corresponding range of parameter values; and executes a process to further categorize stored documents from the target document category and delete documents from an associated sub-category to arrive at the target number.

6. The DPS of claim 5, wherein in executing the process, the processor:

divides the target document category into multiple associated sub-categories respectively associated with different ranges of corresponding data characteristic parameter values, wherein the multiple associated sub-categories are next-level categories derived from a corresponding target document category;

assigns stored documents from the target document category into the multiple sub-categories, according to respective data characteristic parameter values;

determines a maximum number of document sub-categories for which all corresponding stored documents can be deleted without causing a total overall deletion to exceed the target number of stored documents that can be deleted; and deletes all of the stored documents corresponding to the maximum number of document sub-categories corresponding to stored documents that can be deleted.

7. The DPS of claim 1, wherein the processor:

determines whether a count of all the removed stored documents is less than the target number of documents that can be deleted; and in response to the count being less than the target number of stored documents that can be deleted, identifies a document category of remaining, stored documents, which identified document category is adjacent to a document category most recently identified for providing stored documents to be deleted, wherein the identified category is a target document category which comprises corresponding stored documents that can be further categorized.

8. The DPS of claim 1, wherein the processor:

determines whether a total overall count of all the deleted documents is less than the target number of stored documents that can be deleted; and in response to the total overall count being less than the target number of stored documents that can be deleted, recursively performs a set of functions including: identifying a document sub-category having corresponding stored documents that can be further categorized; dividing the identified document sub-category into a plurality of next-level sub-categories; assigning stored documents from the identified document sub-category into the plurality of next-level sub-categories, according to respective data characteristic parameter values; determining a maximum number of next-level sub-categories for which all corresponding stored documents can be deleted without causing a total overall deletion to exceed the target number of stored documents that can be deleted; deleting all of the stored documents corresponding to the maximum number of next-level sub-categories corresponding to stored documents that can be deleted; and determining whether the total overall count is less than the target number.

9. The DPS of claim 8, wherein the DPS operates as a controlling node within the DSS and the utility further causes the processor to:
identify each stored document at each node in a document category in which stored documents are marked for deletion; and
respectively remove, at each node, each identified document in the document category for which stored documents are marked for deletion.

10. The DPS of claim 1, wherein the DPS operates as a controlling node within the DSS and the utility further causes the processor to:
identify a respective value for a pre-determined data storage limit for each node from among a number of nodes within the DSS; and
calculate a sum of the respective values for pre-determined data storage limit for the nodes in the DSS in order to determine the pre-established data storage limit for the DSS.

11. A computer program product comprising:
a non-transitory computer readable medium; and
program code on the non-transitory computer readable medium that when executed within a data processing device within a distributed storage system (DSS), the program code provides the functionality of;
identifying a pre-established data storage threshold value for an amount of data that can be stored within the DSS;
tracking a current storage usage for an amount of data stored within the DSS;
determining whether the current storage usage exceeds the pre-established data storage threshold value;
in response to determining that the current storage usage exceeds the pre-established data storage threshold value, calculating a target number of documents that can be deleted from the DSS based on an amount by which the current storage usage exceeds the pre-established data storage threshold value, wherein the current storage usage is proportional to a number of stored documents in the DSS, wherein the stored documents have a same document type;
determining a data characteristic parameter that can be used to identify parameter values of the stored documents, which parameter values enable the stored documents to be assigned into a plurality of groups which include a set of document categories, wherein the groups are ordered based on a relative index associated with corresponding parameter values, wherein all of the stored documents assigned to at least one of the plurality of groups can be deleted, based on an order associated with the relative index of the document categories, in order to provide the target number of documents that can be deleted;
assigning stored documents to the plurality of groups using corresponding parameter values; and
deleting all of the stored documents assigned to at least one of the plurality of groups in order to remove the target number of stored documents.

12. The computer program product of claim 11, wherein:
the data characteristic parameter is one of (a) an age of stored documents and (b) an acquisition period of stored documents; and
the plurality of groups associated with the data characteristic parameter are time-based groups selected from among groups comprising: (a) a collection of months that span an identified document acquisition period; (b) a collection of weeks that span an identified document acquisition period; (c) a collection of hours that span an identified document acquisition period; and (d) any other collection of time intervals of a measurable time span associated with an identified document acquisition period.

13. The computer program product of claim 11, wherein the program code for assigning further comprises program code for:
selecting a set of document categories that are associated with the determined data characteristic parameter, wherein the selected set of document categories provide an initial set of groups to which stored documents are assigned;
assigning stored documents to the selected set of document categories based on corresponding parameter values associated with the determined data characteristic parameter; and
determining a maximum number of document categories, from among the selected set of document categories, for which all corresponding stored documents can be removed without exceeding the target number of documents that can be deleted.

14. The computer program product of claim 11, wherein the program code further comprises program code for:
in response to the maximum number being greater than zero, deleting all of the stored documents corresponding to the maximum number of document categories from among the selected set of document categories.

15. The computer program product of claim 11, wherein the program code further comprises program code for:
determining whether a count of all the removed stored documents is less than the target number of documents that can be deleted; and
in response to the count being less than the target number of stored documents that can be deleted, identifying a document category of remaining, stored documents, which identified document category is adj acent to a document category most recently identified for providing stored documents to be deleted, wherein the identified category is a target document category which comprises corresponding stored documents that can be further categorized.

16. The computer program product of claim 15, wherein the DPS operates as a controlling node within the DSS and the program code for identifying further comprises program code for:
identifying a respective value for a pre-determined data storage limit for each node from among a number of nodes within the DSS; and
calculating a sum of the respective values for pre-determined data storage limit for the nodes in the DSS in order to determine the pre-established data storage limit for the DSS.

17. The computer program product of claim 15, wherein the DPS operates as a controlling node within the DSS and the program code for deleting further comprises program code for:
identifying each stored document at each node in a document category in which stored documents are marked for deletion; and
respectively removing at each node each identified document in the document category for which stored documents are marked for deletion.

18. The computer program product of claim 11, wherein the program code further comprises program code for:

in response to the maximum number being equal to zero, selecting, from among the identified set of document categories, a first category as a target document category having corresponding stored documents that can be further categorized, wherein the first category holds a first position relative to other document categories based on a corresponding range of parameter values; and executing a process to further categorize stored documents from the target document category and delete documents from an associated sub-category to arrive at the target number.

19. The computer program product of claim 11, wherein the program code further comprises program code for:

dividing the target document category into multiple associated sub-categories respectively associated with different ranges of corresponding data characteristic parameter values, wherein the multiple associated sub-categories are next-level categories derived from a corresponding target document category;

assigning stored documents from the target document category into the multiple sub-categories, according to respective data characteristic parameter values;

determining a maximum number of document sub-categories for which all corresponding stored documents can be deleted without causing a total overall deletion to exceed the target number of stored documents that can be deleted; and deleting all of the stored documents corresponding to the maximum number of document sub-categories corresponding to stored documents that can be deleted.

20. The computer program product of claim 11, wherein the program code further comprises program code for:

determining whether a total overall count of all the deleted documents is less than the target number of stored documents that can be deleted; and in response to the total overall count being less than the target number of stored documents that can be deleted, recursively performing a set of functions including: identifying a document sub-category having corresponding stored documents that can be further categorized; dividing the identified document sub-category into a plurality of next-level sub-categories; assigning stored documents from the identified document sub-category into the plurality of next-level sub-categories, according to respective data characteristic parameter values; determining a maximum number of next-level sub-categories for which all corresponding stored documents can be deleted without causing a total overall deletion to exceed the target number of stored documents that can be deleted; deleting all of the stored documents corresponding to the maximum number of next-level sub-categories corresponding to stored documents that can be deleted; and determining whether the total overall count is less than the target number.

\* \* \* \* \*